(12) United States Patent
Spillane et al.

(10) Patent No.: US 9,785,611 B2
(45) Date of Patent: Oct. 10, 2017

(54) DYNAMIC ELECTRIC POWER LINE MONITORING SYSTEM

(75) Inventors: Philip E. Spillane, Torrance, CA (US);
Alireza Malek, Irvine, CA (US)

(73) Assignee: LINDSEY MANUFACTURING CO.,
Azusa, CA (US)

( * ) Notice: Subject to any disclaimer, the term of this patent is extended or adjusted under 35 U.S.C. 154(b) by 943 days.

(21) Appl. No.: 13/814,239

(22) PCT Filed: Aug. 2, 2011

(86) PCT No.: PCT/US2011/046334
§ 371 (c)(1),
(2), (4) Date: Apr. 10, 2013

(87) PCT Pub. No.: WO2012/018864
PCT Pub. Date: Feb. 9, 2012

(65) Prior Publication Data
US 2013/0191066 A1 Jul. 25, 2013

(51) Int. Cl.
*G01K 11/30* (2006.01)
*G06F 17/00* (2006.01)
(Continued)

(52) U.S. Cl.
CPC ............. *G06F 17/00* (2013.01); *G01B 13/12* (2013.01); *G01B 17/00* (2013.01); *G01K 1/024* (2013.01);
(Continued)

(58) Field of Classification Search
CPC ....................................................... G06F 17/00
See application file for complete search history.

(56) References Cited

U.S. PATENT DOCUMENTS

| 4,420,752 A | 12/1983 | Davis et al. |
| 4,589,081 A | 5/1986 | Massa et al. |

(Continued)

FOREIGN PATENT DOCUMENTS

| JP | 2007-178240 | 7/2007 |
| WO | WO 2004/038891 | 5/2004 |
| WO | WO 2007/031435 | 3/2007 |

OTHER PUBLICATIONS

International Search Report issued in PCT/US2011/046334, 18 pages.
(Continued)

*Primary Examiner* — Phuong Huynh
(74) *Attorney, Agent, or Firm* — Lewis Roca Rothgerber Christie LLP

(57) ABSTRACT

A device and method of precise distance measurement of a transmission line to any object below it is disclosed, along with a network of such devices. The technique employs ultrasonic or laser sensor technology to measure the distance to the nearest object, be it vegetation or a crossing conductor below, and reports that distance wirelessly to the system operator or transmission asset owner. The ultrasonic measurement package may be part of a Transmission Line Security Monitor, which mounts to a transmission line conductor and is powered by the transmission line, transmitting the data by radio links. The technology is equally applicable to encroachment of objects from the side (for example, other transmission lines), as well as to other electrical lines, such as distribution lines, or to other sensing. A built-in transceiver allows the device to communicate with other devices and forward alerts from these devices in a daisy-chain fashion to the intended recipient.

63 Claims, 11 Drawing Sheets

(51) Int. Cl.

| | | |
|---|---|---|
| *H02G 1/02* | (2006.01) | |
| *H02G 7/00* | (2006.01) | |
| *G01B 13/12* | (2006.01) | |
| *G01B 17/00* | (2006.01) | |
| *G01K 1/02* | (2006.01) | |
| *H04Q 9/00* | (2006.01) | |
| *G06F 11/30* | (2006.01) | |
| *G01S 7/00* | (2006.01) | |
| *G01S 15/08* | (2006.01) | |

(52) U.S. Cl.
CPC ............... *H02G 1/02* (2013.01); *H02G 7/00* (2013.01); *H04Q 9/00* (2013.01); *G01S 7/003* (2013.01); *G01S 15/08* (2013.01); *H04Q 2209/25* (2013.01); *H04Q 2209/40* (2013.01); *H04Q 2209/43* (2013.01); *H04Q 2209/823* (2013.01); *H04Q 2209/88* (2013.01)

(56) References Cited

U.S. PATENT DOCUMENTS

| | | |
|---|---|---|
| 4,709,339 A | 11/1987 | Fernandes |
| 4,714,893 A | 12/1987 | Smith-Vaniz et al. |
| 4,758,962 A | 7/1988 | Fernandes |
| 4,799,005 A | 1/1989 | Fernandes |
| 4,801,937 A | 1/1989 | Fernandes |
| 4,818,990 A | 4/1989 | Fernandes |
| 4,829,298 A | 5/1989 | Fernandes |
| 4,843,372 A | 6/1989 | Savino |
| 4,886,980 A | 12/1989 | Fernandes et al. |
| 4,904,996 A | 2/1990 | Fernandes |
| 4,961,644 A | 10/1990 | Marsden |
| 5,029,101 A | 7/1991 | Fernandes |
| 5,132,968 A | 7/1992 | Cephus |
| 5,140,257 A | 8/1992 | Davis |
| 5,341,088 A | 8/1994 | Davis |
| 5,351,032 A | 9/1994 | Latorre et al. |
| 5,372,207 A | 12/1994 | Naville et al. |
| 5,550,476 A | 8/1996 | Lau et al. |
| 5,818,821 A | 10/1998 | Schurig |
| 5,892,430 A | 4/1999 | Wiesman et al. |
| 5,898,558 A | 4/1999 | Ostendorp |
| 6,048,095 A * | 4/2000 | Shindo ............... G01K 1/14 374/182 |
| 6,167,525 A | 12/2000 | Donazzi et al. |
| 6,205,867 B1 | 3/2001 | Hayes et al. |
| 6,333,975 B1 | 12/2001 | Brunn et al. |
| 6,523,424 B1 | 2/2003 | Hayes et al. |
| 6,677,743 B1 | 1/2004 | Coolidge et al. |
| 6,794,991 B2 | 9/2004 | Dungan |
| 6,845,333 B2 | 1/2005 | Anderson et al. |
| 6,965,302 B2 | 11/2005 | Mollenkopf et al. |
| 6,965,303 B2 | 11/2005 | Mollenkopf |
| 6,965,320 B1 | 11/2005 | Casey et al. |
| 7,053,770 B2 | 5/2006 | Ratiu et al. |
| 7,202,797 B2 | 4/2007 | Zhavi |
| 7,282,944 B2 | 10/2007 | Gunn et al. |
| 7,304,976 B2 | 12/2007 | Mao et al. |
| 7,369,045 B2 | 5/2008 | Hansen |
| 7,557,563 B2 | 7/2009 | Gunn et al. |
| 7,626,508 B2 | 12/2009 | Kosuge et al. |
| 7,701,325 B2 | 4/2010 | White, II |
| 7,714,735 B2 | 5/2010 | Rockwell |
| 7,733,094 B2 | 6/2010 | Bright et al. |
| 7,764,169 B2 | 7/2010 | Rowell et al. |
| 7,786,894 B2 | 8/2010 | Polk et al. |
| 2002/0019725 A1 | 2/2002 | Petite |
| 2003/0162539 A1 | 8/2003 | Fiut et al. |
| 2004/0054921 A1 | 3/2004 | Land, III |
| 2004/0071185 A1 | 4/2004 | Syracuse et al. |
| 2005/0231387 A1 | 10/2005 | Markelz |
| 2006/0077918 A1 | 4/2006 | Mao et al. |
| 2006/0187017 A1 | 8/2006 | Kulesz et al. |
| 2007/0002771 A1 | 1/2007 | Berkman et al. |
| 2007/0116403 A1 | 5/2007 | Blemel |
| 2007/0152808 A1 | 7/2007 | LaCasse |
| 2008/0024321 A1 * | 1/2008 | Polk .................. H04L 12/66 340/870.07 |
| 2008/0208532 A1 | 8/2008 | Blemel |
| 2008/0228294 A1 * | 9/2008 | Nielsen .............. G01C 15/02 700/58 |
| 2008/0297162 A1 | 12/2008 | Bright et al. |
| 2009/0167522 A1 | 7/2009 | Coty et al. |
| 2009/0187285 A1 | 7/2009 | Yaney et al. |
| 2009/0268553 A1 * | 10/2009 | Ecker .................. G01S 7/003 367/119 |
| 2010/0033345 A1 | 2/2010 | Polk et al. |

OTHER PUBLICATIONS

Advisory Action for Ex Parte Reexamination for U.S. Appl. No. 90/012,655, dated Oct. 23, 2013, 17 pages.
Final Office Action for Ex Parte Reexamination for U.S. Appl. No. 90/012,655, dated Aug. 6, 2013, 2012; 92 pages.
Final Office Action for U.S. Appl. No. 12/572,141, dated Jul. 3, 2013, dated Oct. 1, 2009, 25 pages.
Non-Final Office Action for Ex Parte Reexamination for U.S. Appl. No. 90/012,655, dated Mar. 14, 2013, 28 pages.
Office Action for U.S. Appl. No. 12/572,141, dated Jan. 30, 2013, 20 pages.
Order Granting Ex Parte Reexamination for U.S. Appl. No. 90/012,655, dated Dec. 12, 2012, 22 pages.
Advisory Action for U.S. Appl. No. 12/572,141, dated Apr. 7, 2011, 3 pages.
Final Office Action for U.S. Appl. No. 12/572,141, dated Jan. 26, 2011, 10 pages.
Office Action for U.S. Appl. No. 12/572,141, dated Aug. 23, 2010, 18 pages.
Notice of Allowance for U.S. Appl. No. 11/425,287, dated Feb. 25, 2010, 7 pages.
Advisory Action for U.S. Appl. No. 11/425,287, dated Jan. 25, 2010, 3 pages.
Final Office Action for U.S. Appl. No. 11/425,287, dated Nov. 9, 2009, 10 pages.
Office Action for U.S. Appl. No. 11/425,287, dated May 22, 2009, 27 pages.
Final Office Action for U.S. Appl. No. 11/425,287, dated Dec. 10, 2008, 9 pages.
Office Action for U.S. Appl. No. 11/425,287, dated Jul. 1, 2008, 10 pages.
Ex Parte Reexamination Communication Transmittal Form; Notice of Intent to Issue Ex Parte Reexamination Certificate and Interview Summary for U.S. Appl. No. 90/012,655, dated Dec. 3, 2013, 13 pages.
Office Action for U.S. Appl. No. 12/848,946, dated Aug. 1, 2012, 21 pages.
Final Office Action for U.S. Appl. No. 12/848,946, dated Feb. 19, 2013, 17 pages.
Notice of Allowance for U.S. Appl. No. 12/848,946, dated Sep. 3, 2013, 9 pages.
Notice of Allowance for U.S. Appl. No. 12/848,946, dated Jan. 17, 2014, 8 pages.
Extended European Search Report for EP Application No. 11815230.5, dated Aug. 4, 2016, 9 pages.

* cited by examiner

DYNAMIC ELECTRIC POWER LINE MONITORING SYSTEM

CROSS-REFERENCE TO RELATED APPLICATION(S)

This application is a National Phase Patent Application which claims priority and the benefit of International Application Number PCT/US2011/046334, filed on Aug. 2, 2011, which claims priority to and benefit of U.S. application Ser. No. 12/848,946, filed on Aug. 2, 2010, the entire disclosure of which are incorporated herein by reference.

BACKGROUND

Field

Aspects of embodiments of the present invention relate to the field of electric power lines. More specifically, aspects of the present invention relate to the field of monitoring or communicating from electric power lines.

Description of the Related Art

As a transmission line is pushed to carry more energy, the conductor heats and, because of the added heat, the conductor expands and the transmission line sags. If the temperature of the transmission line exceeds the rated temperature of the conductor, the mechanical and electrical integrity of the conductor will be compromised. The traditional method of determining the conductor sag has been derived by a set of operating conditions. For example, knowing the conductor's physical size, its manufacturer's rated current capacity, current flow, the approximate still air ambient temperature, wind speed, and time of day, the system operator could "approximate" how much the conductor sags.

This approximation, however, can provide a false sense of security. For instance, the Northeast Blackout of 2003 was the result of an overloaded transmission line flashing over to ground by sagging into vegetation below the transmission line. The system operator had no knowledge that the transmission line was in danger as it was being operated within the system standard operating conditions.

What is needed is a means for precise measurement of operating conditions of a transmission line (e.g., conductor height, temperature) and a means for quickly reporting these measurements to, for example, a system operator (who may be a considerable distance away) to take any necessary or appropriate actions.

SUMMARY

Embodiments of the present invention provide for a device, method, and network of devices for accurately measuring and quickly disseminating information related to an electric power line conductor (for example, the conductor temperature or sag of a transmission line or distribution line) using one or more sensing devices that are attached to the power lines and equipped with wireless transmitters. Timely, accurate knowledge of information such as conductor temperature or sag can allow engineers and asset owners of existing power lines to more efficiently deliver electricity while reducing or minimizing the risk of factors such as interfering with other structures, overloading the power line, or operating the conductor at higher than its rated temperature (which can lead to problems such as compromising the mechanical or electrical integrity of the conductor, or causing excessive transmission line sag and risk to the power line or other nearby structures). For example, there may be required clearances of power lines from different fabricated or natural structures such as buildings or trees that should be taken into consideration when operating the line.

For example, in some embodiments, a system and method of very precise distance measurement of an electrical power line to any object around it (for instance, below it) is provided. In exemplary embodiments, ultrasonic or laser sensor technology is used in the device attached to the power line to measure the distance to the nearest object (such as vegetation, a crossing conductor below, etc.), or infrared sensor technology is used in the device to measure the temperature of the attached power line conductor. The device then uses the transmitter to transmit the information and, optionally, the GPS location or other sensor information wirelessly to the system operator or transmission asset owner in real time.

According to some embodiments, the ultrasonic or laser distance measurement package, or infrared temperature-sensing package, is part of a Dynamic Transmission Line Security Monitor, which mounts to a transmission line conductor and is powered by the transmission line. See, for example, Polk et al., U.S. Patent Application Pub. No. 2008/0024321, the content of which is herein incorporated by reference. Numerous such monitors, each with their own transmitter, may be attached to the transmission line at appropriate locations.

Furthermore, in exemplary embodiments, some or all of the monitors are equipped with transceivers (or receivers in addition to the transmitters) and located sufficiently close to each other that each such monitor is within the transmission range of other monitors, to form a network or "mesh" (for example, a daisy chain) of transceivers. Each such monitor in the mesh can communicate with any other monitor in the mesh, possibly using other (intermediate) monitors in the mesh to receive and retransmit the communication (for example, along the daisy chain).

Timely reporting of local sensor data such as transmission line sag or conductor temperature promotes better management and more efficient use of existing electrical distribution networks, thus forestalling the building of new networks.

In an exemplary embodiment of the present invention, a device for attaching to an electrical power line is disclosed. The device includes a distance sensor, a wireless transmitter, a processor, and a power supply. The distance sensor is configured to measure the distance of an object to the device. The processor is adapted to interpret the measured distance from the distance sensor, and transmit a message related to the interpreted distance through the transmitter. The power supply is configured to supply power to the distance sensor, the transmitter, and the processor.

The distance sensor may include an ultrasonic or laser distance sensor.

The power line may include a transmission line.

The transmission line may include a high voltage line.

The high voltage line may be configured to operate between 110 kV and 765 kV.

The power supply may include an inductive power supply configured to generate power inductively from the power line.

The distance sensor may be configured to sense down and measure the distance to the object that is beneath the power line.

The distance sensor may be configured to sense sideways and measure the distance to the object that is beside the power line.

The device may further include a global navigation satellite system sensor to identify a location of the device. The processor may be further adapted to transmit the location in the message.

The device may further include a wireless receiver configured to receive another such message from another such device. The processor may be further adapted to receive the other message from the other device through the receiver, and retransmit the other message through the transmitter.

In another exemplary embodiment of the present invention, a method of automated measuring and alerting of an object in the proximity of an electrical power line using a distance sensor is provided. The distance sensor is configured in a device attached to the power line. The device includes a wireless transmitter and a processor. The method includes: measuring the distance of the object to the device using the distance sensor, interpreting the measured distance using the processor, and transmitting a message based on the interpreted distance using the transmitter.

The power line may include a transmission line.

The distance sensor may include an ultrasonic or laser distance sensor.

The device may further include a wireless receiver configured to receive another such message from another such device. The method may further include: receiving the other message from the other device through the receiver, and retransmitting the other message through the transmitter.

The device may be further configured to generate power inductively from the power line.

According to yet another embodiment of the present invention, a network of devices for attaching to an electrical power line and communicating with an intended recipient is provided. Each device of the network of devices includes a distance sensor, a wireless transceiver, an inductive power generator, and a processor. The distance sensor is configured to measure the distance of an object to the device. The inductive power generator is configured to generate electrical power inductively from the power line for use by the device. The processor is adapted to interpret the measured distance from the distance sensor, transmit a message related to the interpreted distance through the transceiver, receive another such message through the transceiver from another device in the network of devices, and retransmit the other message from the other device through the transceiver. The network of devices is configured to wirelessly communicate the message from the device to the intended recipient.

The power line may include a transmission line.

The network may be further configured to wirelessly communicate the message from the device to the intended recipient even in the event that another of the devices in the network is unable to retransmit messages.

The distance sensor may be configured to sense down and measure the distance to the object that is beneath the power line.

Each device of the network of devices may further include a global navigation satellite system sensor to identify a location of the device. The processor may be further adapted to transmit the location in the message.

According to another exemplary embodiment of the present invention, a device for attaching to an electrical power line is disclosed. The device includes a temperature sensor, a wireless transmitter, a processor, and a power supply. The temperature sensor is configured to measure the temperature of an object in a proximity of the power line. The processor is configured to interpret the measured temperature from the temperature sensor and to transmit a message related to the interpreted temperature through the transmitter. The power supply is configured to supply power to the temperature sensor, the transmitter, and the processor.

The temperature sensor may include an infrared temperature sensor.

The object may include a conductor of the attached power line.

The power line may include a high voltage transmission line.

The power supply may include an inductive power supply configured to generate power inductively from the power line.

The temperature sensor may include an ambient temperature sensor for measuring an ambient temperature in a proximity of the temperature sensor. The processor may be further configured to interpret the measured ambient temperature from the ambient temperature sensor and to transmit a message related to the interpreted ambient temperature through the transmitter.

The temperature sensor may include a board temperature sensor for measuring a board temperature of a circuit board comprising the processor. The processor may be further configured to interpret the measured board temperature from the board temperature sensor and to transmit a message related to the interpreted board temperature through the transmitter.

The device may further include a global navigation satellite system sensor to identify a location of the device. The processor may be further configured to transmit the location in the message.

The device may further include a wireless receiver configured to receive another such message from another such device. The processor may be further configured to receive the other message from the other device through the receiver and to retransmit the other message through the transmitter.

According to yet another exemplary embodiment of the present invention, a method of automated measuring and alerting of a temperature of an object using a temperature sensor is provided. The object is in a proximity of an electrical power line. The temperature sensor is configured in a device attached to the power line. The device includes a wireless transmitter and a processor. The method includes: measuring the temperature of the object using the temperature sensor; interpreting the measured temperature using the processor; and transmitting a message based on the interpreted temperature using the transmitter.

The power line may include a transmission line.

The temperature sensor may include an infrared temperature sensor.

The object may include a conductor of the attached power line.

The device may further include a wireless receiver configured to receive another such message from another such device. The method may further include: receiving the other message from the other device through the receiver; and retransmitting the other message through the transmitter.

The device may be further configured to generate power inductively from the power line.

According to still yet another exemplary embodiment of the present invention, a network of devices for attaching to an electrical power line and communicating with an intended recipient is provided. Each device of the network of devices includes a temperature sensor, a wireless transceiver, an inductive power generator, and a processor. The temperature sensor may be configured to measure the temperature of an object in a proximity of the power line. The inductive power generator may be configured to generate electrical power inductively from the power line for use by the device. The processor may be configured to interpret the measured temperature from the temperature sensor, to transmit a message related to the interpreted temperature through the transceiver, to receive another such message through the transceiver from another device in the network of devices, and to retransmit the other message from the other device through the transceiver. The network of devices may be configured to wirelessly communicate the message from the device to the intended recipient.

The power line may include a transmission line.

The network may be further configured to wirelessly communicate the message from the device to the intended recipient even when another of the devices in the network is unable to retransmit messages.

The temperature sensor may include an infrared temperature sensor. The object may include a conductor of the attached power line.

The temperature sensor may further include one of an ambient temperature sensor for measuring an ambient temperature in a proximity of the temperature sensor or a board temperature sensor for measuring a board temperature of a circuit board comprising the processor. The processor may be further configured to interpret one of the measured ambient temperature from the ambient temperature sensor or the measured board temperature from the board temperature sensor, and to transmit a message related to one of the interpreted ambient temperature or the interpreted board temperature through the transceiver.

According to another exemplary embodiment of the present invention, a device for attaching to an electrical power line is provided. The device includes: a sensor for sensing a vicinity of the power line; a wireless transceiver for interconnecting the device with other devices in a wireless network by receiving messages from the other devices and retransmitting those ones of the messages not intended for the device; a processor; and a power supply for supplying power to the sensor, the transceiver, and the processor. The processor is for interpreting a sensor reading from the sensor, and transmitting a message related to the interpreted sensor reading through the transceiver.

The sensor may include a temperature, distance, or motion sensor.

The power line may include a high voltage transmission line.

The power supply may include an inductive power supply for generating power inductively from the power line.

The device may further include a capacitor for supplying stored power to the device.

The transceiver may be configured to retransmit each of the messages no more than once.

The transceiver may be configured to only retransmit those ones of the messages whose intended recipients are closer to the device than they are to corresponding ones of the devices that transmitted the ones of the messages.

"Closer" may be defined by a linear order of the devices.

The device may further include a non-volatile memory for storing an address of a base station.

The non-volatile memory may be further for storing a location of the device.

According to yet another exemplary embodiment of the present invention, a method of automated sensing of a proximity of an electrical power line using a sensor configured in each of a wireless network of devices attached to and inductively powered by the power line and each including a transceiver and a processor for communicating with a transceiver-equipped base station is provided. The method includes: sensing a vicinity of the power line using the sensor in one of the devices; interpreting a sensor reading from the sensor using the processor of the one of the devices; transmitting a first message based on the interpreted sensor reading using the transceiver of the one of the devices; and receiving and retransmitting the first message using the transceiver of others of the devices to forward the message to the base station.

The method may further include: transmitting a second message to the one of the devices using the transceiver of the base station; and receiving and retransmitting the second message using the transceiver of the others of the devices to forward the message to the one of the devices.

The one of the devices may transmit the first message in response to receiving the second message.

The receiving and retransmitting of the first message may include only retransmitting the first message in the transceiver of ones of the devices that are closer to the base station than corresponding ones of the devices from which they received the first message are to the base station.

"Closer" may be defined by a linear order of the network of devices.

The method may further include initializing the network of devices to define the linear order by: transmitting a command using the transceiver of the base station; and receiving and retransmitting the command using the transceiver of the devices.

The method may further include re-initializing the network of devices to redefine the linear order when a device is added to or removed from the network.

Each of the others of the devices may retransmit the first message no more than once.

According to still yet another exemplary embodiment of the present invention, a wireless network of devices for attaching to an electrical power line and communicating with a transceiver-equipped base station is provided. Each device of the network of devices includes: a sensor for sensing a vicinity of the power line; a wireless transceiver for interconnecting the device with others of the devices and with the base station by receiving messages from the others of the devices and retransmitting those ones of the messages not intended for the device; an inductive power generator for generating electrical power inductively from the power line for use by the device; and a processor. The processor is for: interpreting the sensor reading from the sensor; transmitting a message related to the interpreted sensor reading through the transceiver; receiving another such message through the transceiver from another of the devices; and retransmitting the other message from the other device through the transceiver only if the device is closer to the base station than the other device is to the base station.

"Closer" may be defined by a linear order of the network of devices that is dynamically defined by an initialization routine initiated by the base station.

BRIEF DESCRIPTION OF THE DRAWINGS

The accompanying drawings illustrate embodiments of the present invention, and together with the description, serve to explain the principles of the embodiments of the present invention.

DETAILED DESCRIPTION

Figure 1:
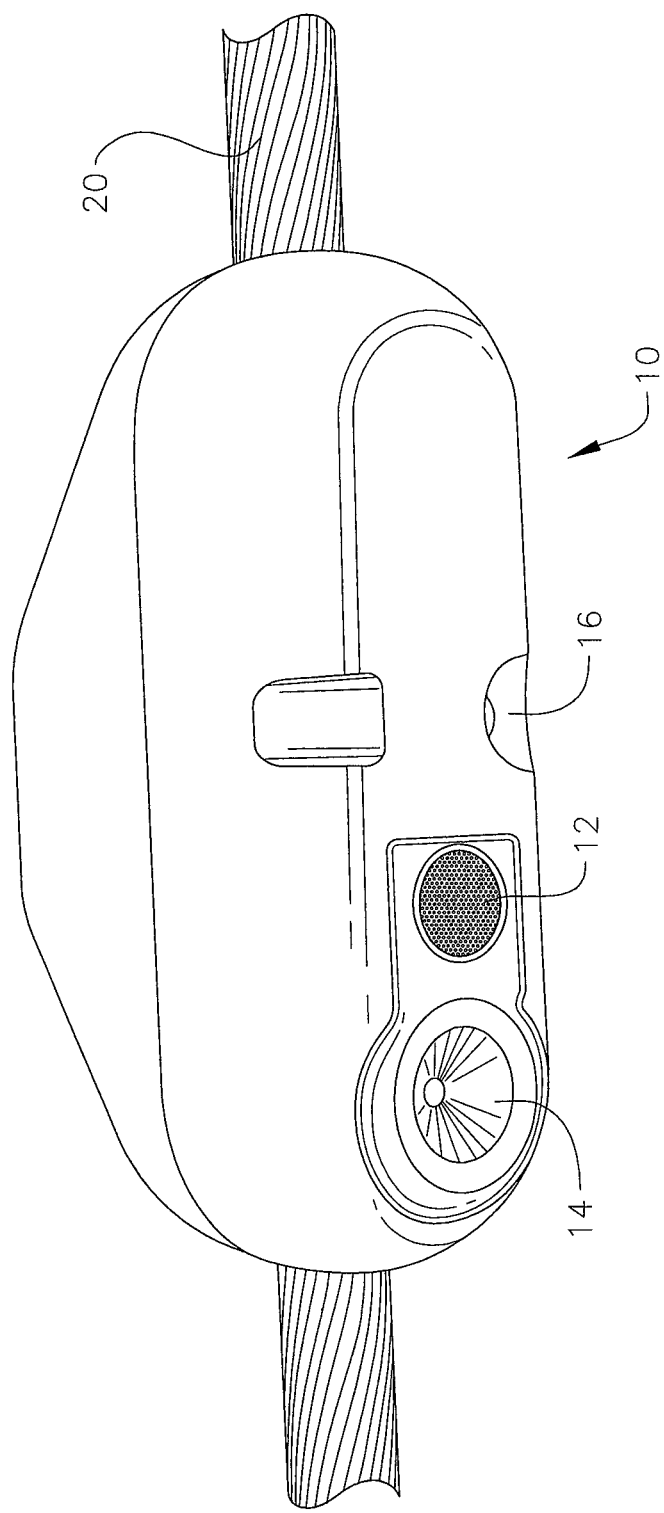
FIG. 1 is an illustration of an exemplary transmission line device with distance and other sensors, according to an embodiment of the present invention.

The illustrative embodiments that follow are only exemplary applications of the present invention and not intended to limit the scope of the invention. For example, while the embodiments may be directed to electrical transmission lines, there is nothing to prevent other embodiments from being directed to electrical distribution lines, or to any type of electrical power line. Further, while embodiments may be directed at detecting the sag (for example, the distance to the nearest object below an electrical line) or the conductor temperature of an attached power line (for example, the temperature of an attached transmission line), there is nothing to prevent other embodiments from being directed to detecting the proximity of an object (for example, a neighboring transmission line) located to the side of the transmission line, or anywhere else in relation to the transmission line. In addition, while embodiments may be directed at communicating sensed information of an attached power line (for example, the conductor temperature of an attached transmission line, or the distance to the closest object below the transmission line), there is nothing to prevent other embodiments from being directed to communicating other information (sensed or not) related to the power line or other nearby phenomena. Still other embodiments may be directed to other electric power line monitoring (for example, temperature, motion, etc.) or monitoring from the electric power line, using a network (mesh) of transceiver-equipped monitors to maintain communication between each of the monitors and an intended recipient (such as the power line owner). In the drawings, like reference numerals refer to like elements throughout.

Aspects of embodiments of the present application were described in U.S. patent application Ser. No. 12/848,946, entitled "Dynamic Electric Power Line Monitoring System," filed on Aug. 2, 2010, the entire content of which is herein incorporated by reference. In that application, exemplary embodiments, including a device, method, and network of devices for precisely measuring the distance of a nearby object to an electric power line, were disclosed.

Exemplary embodiments are directed to a device and technique of very precise distance measurement and reporting of a transmission line to any object below it, such as growing vegetation, a crossing conductor, etc. Each such device is equipped with a transmitter to allow wireless communication with an intended recipient. Using off-the-shelf ultrasonic sensor or laser sensor technology, for instance, to measure the distance to the nearest object, example devices transmit that distance and other relevant information—for example, optionally reporting the Global Positioning System (GPS) location—wirelessly to the system operator or transmission asset owner. The data can be analyzed, for instance, to determine if corrective action (e.g., changing power load, dispatching work crews) needs to take place.

Further exemplary embodiments are directed to a device and technique of precise measurement and reporting of the temperature of a transmission line conductor. Each such device is equipped with a transmitter to allow wireless communication with an intended recipient. Using off-the-shelf infrared sensor technology, for instance, to measure the temperature of the attached conductor, example devices transmit that temperature and other relevant information wirelessly to the system operator or transmission asset owner.

Still further exemplary embodiments are directed to a device and technique of wireless communication between a network of devices attached to power lines. Each such device is equipped with a transmitter or transceiver to allow wireless communication with an intended recipient. The devices can use off-the-shelf wireless communication technology, for instance 900 MHz or 2.4 GHz. The devices can also use industry standard protocols, such as Institute of Electrical and Electronic Engineers (IEEE) 802.11. The devices transmit and receive messages from nearby monitors that are similarly equipped.

In some embodiments, the ultrasonic or laser measurement package, or the infrared temperature measurement package, or the mesh radio package is part of a Dynamic Transmission Line Security Monitor, which mounts to a transmission line conductor and is powered by the transmission line, transmitting the data by radio links. See the above Polk et al. reference.

Figure 3:
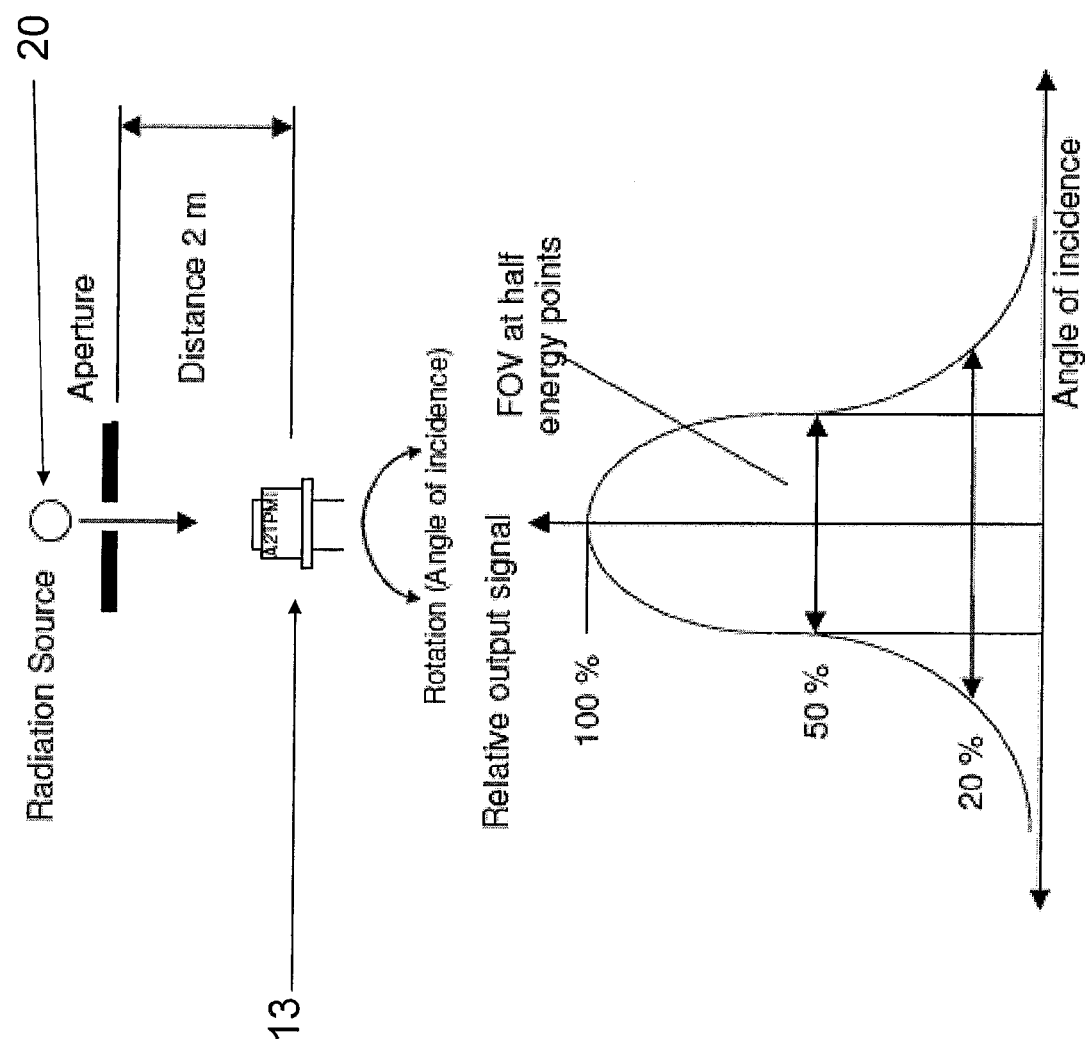
FIG. 3 is a schematic diagram and graph of an exemplary infrared temperature sensor suitable for use in an embodiment of the present invention.

FIG. 3 is a schematic diagram and graph of an exemplary infrared (IR) temperature sensor 13 suitable for use in an embodiment of the present invention (courtesy of Perkin Elmers). IR temperature sensor 13, when directed at a radiation source, for example, transmission line conductor 20, detects the temperature difference between the radiation source 20 and the IR temperature sensor 13. This difference, combined with the ambient temperature of the IR temperature sensor 13, allows the temperature of the radiation source 20 to be determined. While IR temperature sensor 13 is shown 2 meters from radiation source 20 in FIG. 3, in practice, the sensor 13 can be almost any distance from the source 20, subject to signal strength drop-off that is affected primarily by the angle of incidence of the sensor 13 to the source 20 (see the corresponding graph in FIG. 3 of angle of incidence versus relative output signal of the sensor 13). For example, the sensor 13 can be located 1 inch from the conductor 20 in an exemplary embodiment (which keeps the device size relatively small and the output signal close to the maximum possible).

Numerous such monitors, each with their own transceiver (or a transmitter and a corresponding receiver), may be attached to the transmission line. The transmission line may be formed in spans, each span being a portion of the transmission line between two adjacent transmission line towers for supporting the transmission line above ground. Two spans will be described as "consecutive" if they are part of the same transmission line and share a common transmission line tower. There may also be multiple transmission lines between towers, with one transmission line being described as "neighboring" another transmission line if the two transmission lines have spans between the same transmission line towers.

The conductor temperature can vary between spans of the same transmission line, in addition to varying between spans of different transmission lines between the same transmission line towers. The conductor temperature can vary depending on several factors, including, but not limited to: the type of conductor material, the age of the conductor material, the ambient temperature, the location, and the electric current flowing through the conductor (which is usually the same between consecutive spans).

While many existing conductors are rated to operate at a maximum temperature of 100° C., newer conductors (capable of carrying significantly more current) are rated up to 250° C. Operating a transmission line at a higher temperature allows more current to be transmitted. For example, a transmission line capable of transmitting 1000 amperes (amps) of current at 100° C. may be capable of transmitting 1700 amps at 200° C. (that is, the temperature-to-current relationship may be superlinear with respect to absolute temperature). Thus, accurate knowledge of the conductor temperature can be very beneficial in improving or maximizing the efficiency of the transmission line.

However, operating a conductor above its rated temperature can cause undesired consequences. For example, the transmission line can start to sag, plus the conductor properties start to degrade. These effects get more pronounced with higher operating temperatures. In fact, aluminum (a common conductor material) melts at 660° C., so it is important to keep the conductor temperature well below that level.

In an exemplary network of monitors, the monitors are sufficiently close (for example, the monitors may be located mid-span between each pair of adjacent transmission line towers) that each monitor is within the transmission range of other monitors, to form a "mesh" (for example, a daisy chain) of transceivers, whose combined transmission/reception coverage eventually reaches a base station. Mesh networking is a powerful way to route data. The range of a single transmitter is extended practically indefinitely by allowing data to hop from node to node (that is, from one device to another, each device using the transceiver to receive and forward the message to another device). Each such monitor in the mesh can then communicate with any other monitor in the mesh, possibly using other (intermediate) monitors in the mesh to receive and retransmit the communication (for example, along the daisy chain). In this case, the base station is itself a node, having a compatible transceiver to those of the devices. The base station may have further equipment, such as a computer to help manage and monitor the mesh network.

Reliability is also enhanced with mesh networking, in that the network can be configured to be "self healing," that is, creating alternate paths when a node (device) fails, or when a communication gets lost along the intended path. Thus, the more densely arranged the devices are in the mesh network, the more robust the network can be configured to be. This allows for more failing devices without bringing down the network, or isolating portions of the network from being able to communicate with the base station.

FIG. 1 is an illustration of an exemplary transmission line device with distance sensor, according to an embodiment of the present invention.

Referring to FIG. 1, the device 10 has two halves, a top half and a bottom half, and attaches to a transmission line 20 by clasping the two halves around the transmission line conductor 20 and securing them. For example, a bolt can be inserted through recess 16 to secure the two halves. The device 10 is shown with two external sensors, a distance sensor 12 (such as an ultrasonic distance sensor or a laser distance sensor) to measure the distance between the device 10 and any object below it, and an infrared (IR) motion sensor 14 to detect motion of a heat source below the device 10. Internal to the device 10 is a temperature sensor 13 (see FIGS. 2-4), for example an infrared (IR) temperature sensor 13 to measure the temperature of the conductor (transmission line). In some embodiments, the IR temperature sensor 13 may further include an ambient air temperature sensor 13a to measure the temperature the ambient temperature proximal to the IR temperature sensor 13, and a (circuit) board temperature sensor 13b to measure the temperature of the circuit board for a processor 19 (see FIGS. 2 and 4) and other important electronics.

Other sensors—for example, other motion sensors such as an accelerometer to measure pitch and roll of the device 10 or a vibration sensor for measuring vibration of the device 10, or a thermocouple to measure the temperature of the conductor (in place of the IR temperature sensor 13), etc.—may be added to, may be internal to, or may replace these components of the device 10. For instance, the temperature of the conductor could be sensed by drilling a hole in the conductor and installing a thermocouple. The sensors do not necessarily have to be sensing the power line or its immediate surroundings. They could, for example, sense weather-related phenomena, such as cloud cover.

It should be noted that, unlike a thermocouple, an IR temperature sensor (thermometer) does not need to touch the conductor, which may make installation of an IR thermometer-equipped device easier and more operator friendly than that of a thermocouple-equipped device. That is, unlike the above-described thermocouple, an IR temperature sensor is essentially a passive (non-invasive) device, and has little impact on the measured temperature of the conductor. The IR thermometer may use the same technology as a laser thermometer (which uses a laser to help aim the thermometer).

Further, an IR temperature sensor measures conductor temperature accurately using the high wavelength (approximately 10 μm) radiation from the power line; such a measurement corresponds very closely to the actual temperature of the conductor. This can also make the IR temperature sensor much faster than a thermocouple, which may have to come to equilibrium with the power line before providing an accurate temperature.

The IR temperature sensor 13 may further include an ambient temperature sensor (thermometer) 13a to measure the temperature near the IR temperature sensor 13 (and other internal electronics). This ambient temperature sensor 13a can be used, for example, to detect if the internal electronics are being operated at a safe temperature (for example, under 85° C.). In addition, the ambient air temperature sensor 13a can be used to calibrate the IR temperature sensor 13, which may be configured to sense the difference in temperature between the target (conductor) and the ambient air.

In addition, the IR temperature sensor 13 may further include a board temperature sensor (thermometer) 13b to measure the temperature of a circuit board that includes the processor 19 and possibly other electronics. The board temperature sensor 13b may also be configured to detect if the electronics are being operated at a safe temperature (for example, below 85° C.).

In other embodiments, the ambient temperature sensor 13a or the board temperature sensor 13b (or both) are separate components from the IR temperature sensor 13.

Also internal to the device 10 in FIG. 1 (see also FIGS. 2 and 4) are a transceiver 15 (or separate transmitter and receiver), an optional global navigation satellite system (GNSS) sensor, a processor 19, and a power source 17. The transceiver 15 is for sending and receiving messages (such as alerts) with, for example, other such devices 10, and can be a standard off-the-shelf radio for wireless communications (with a separate microprocessor and associated software or firmware from the manufacturer for driving the underlying wireless communication protocol). The optional GNSS sensor—for example, a Global Positioning System (GPS) sensor—is for detecting the location of the device 10. In other embodiments, the location of the device 10 can be programmed into the device 10 when the device 10 is installed (for example, using a separate GPS sensor and then entering the location into non-volatile memory in the device 10). The processor 19 is for interpreting the sensor readings, sending alerts to suitable receivers using the transmitter portion of the transceiver 15, and relaying alerts from the processors 19 of other devices 10.

The processor may have associated with it (e.g., as part of, or nearby) a non-volatile memory for storing important information that the processor 19 needs to reference even if the power source 17 should be interrupted. For instance, the processor may store location information (such as longitude and latitude) or networking information (such as network addresses) in the non-volatile memory that can be programmed into the memory when the device 10 is installed on the electrical line.

The power source 17 is for supplying power to the components of the device 10, such as the sensors 12, 13, 14, the transceiver 15, and the processor 19. The power source 17 may be, for example, an inductive power generator (that generates power inductively from the transmission line 20). The power source 17 may also be a stored power supply (for example, a stored power supply that is charged from the inductive power generator). For instance, the device 10 could use a capacitor to store enough power (such as one minute's worth) to be able to process any urgent matters and shut down gracefully in the event of a power interruption on the transmission line 20) The inductive power supply, for example, could be configured to generate power based on the current of the electrical lines to which it is attached.

Figure 2:
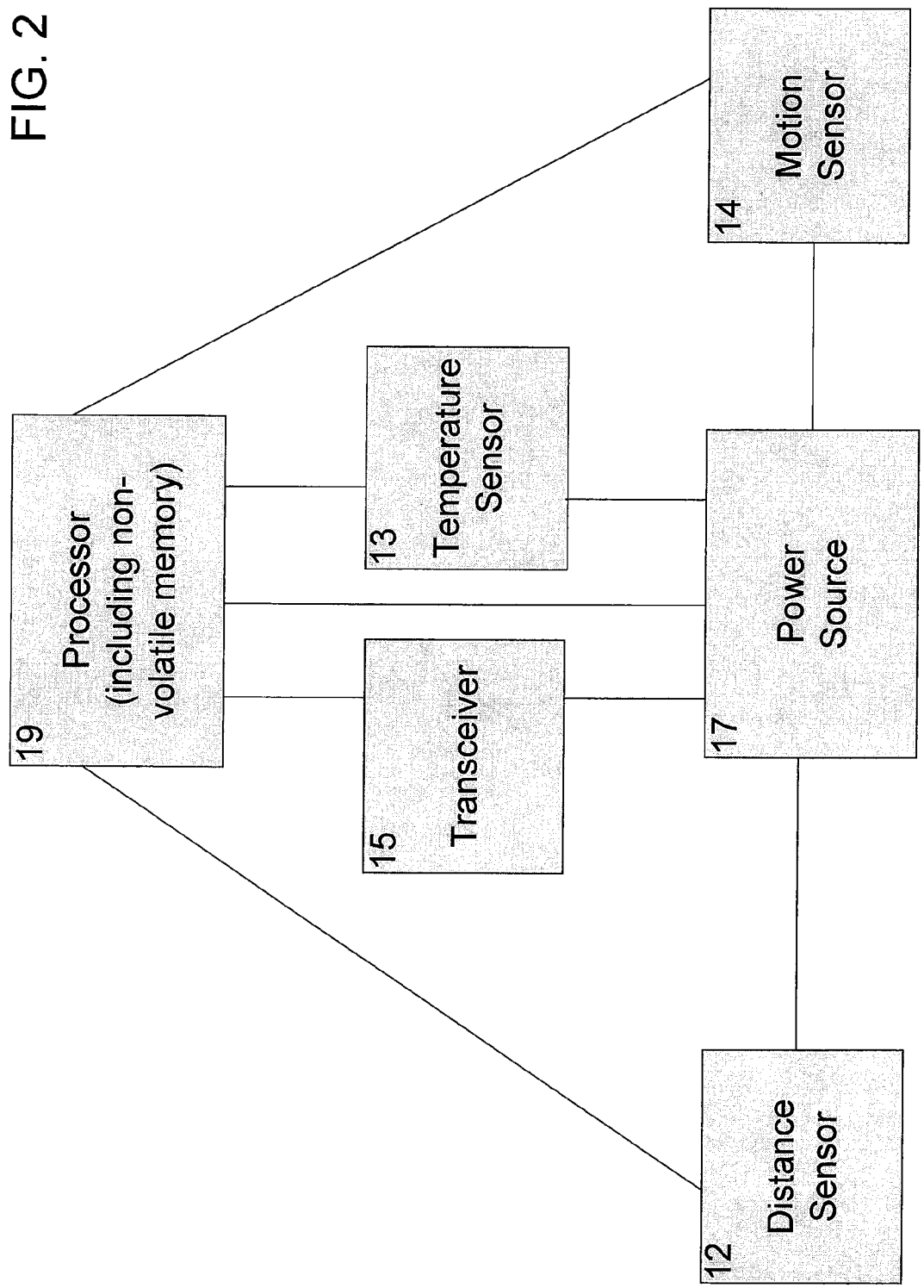
FIG. 2 is a block diagram of the components and their connections of an exemplary transmission line device with sensors and a transceiver, according to an embodiment of the present invention.

FIG. 2 is a block diagram of the components and their connections in an exemplary transmission line device 10 with sensors 12, 13, 14 and a transceiver 15 (see, for example, device 10 in FIG. 1), according to an embodiment of the present invention. As described above, the components include a distance sensor 12, a transceiver 15, a processor 19, a power source 17, a temperature sensor 13, and an optional IR motion (or other) sensor 14. The power source 17 supplies power to each of the other components. The processor 19 is also connected to each of the other components, to coordinate their readings, transmissions, etc.

In some embodiments, the processor 19 is configured on a circuit board, possibly with other internal electrical components.

Figure 4:
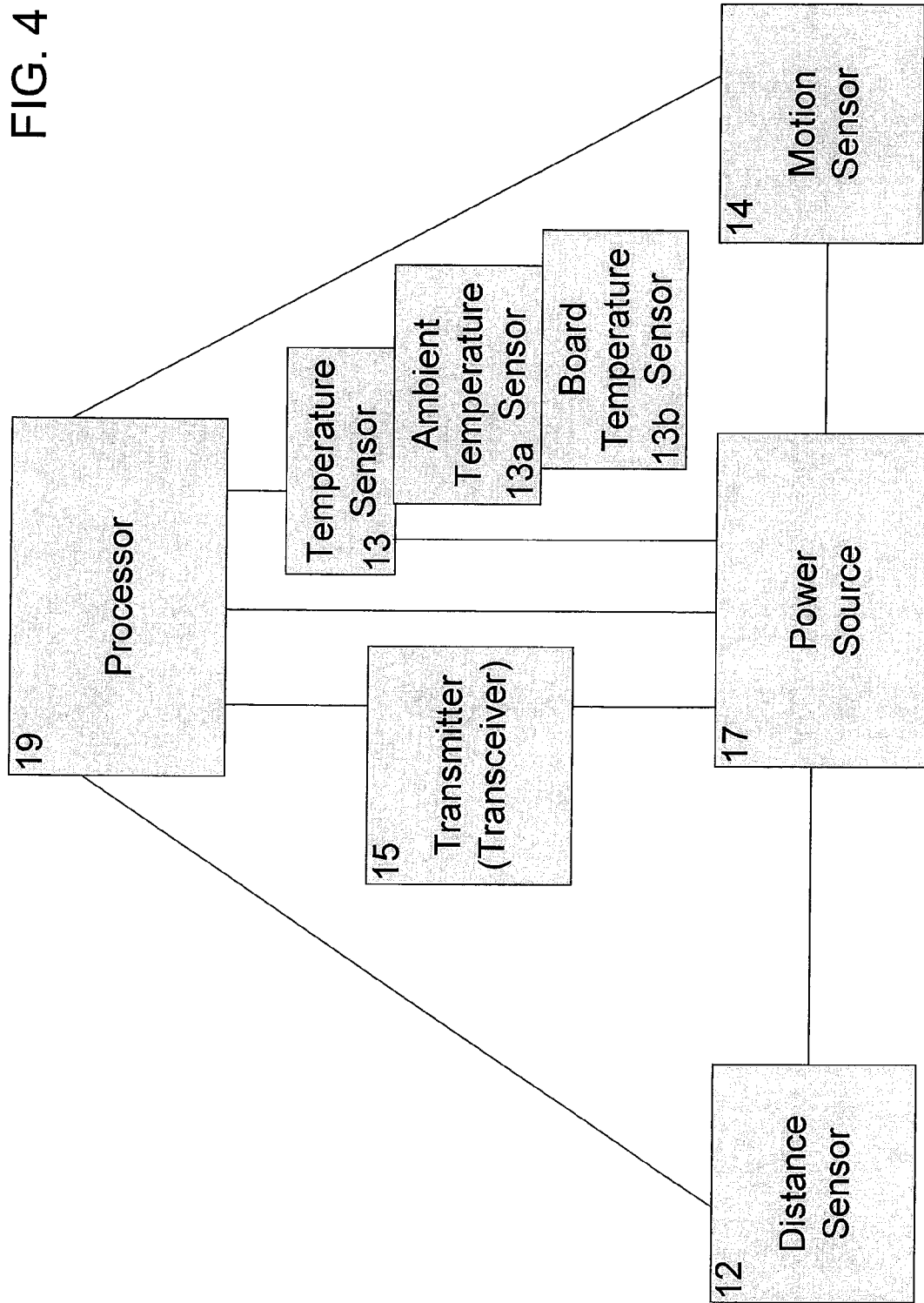
FIG. 4 is a block diagram of the components and their connections of an exemplary transmission line device with conductor temperature and other sensors, according to an embodiment of the present invention.

FIG. 4 is a block diagram of the components and their connections in an exemplary transmission line device with an IR temperature and other sensors (see, for example, FIG. 1), according to an embodiment of the present invention. As described above, the components include a distance sensor 12, a transmitter (or transceiver) 15, a processor 19, a power source 17, a temperature sensor 13, and an optional IR motion (or other) sensor 14. The power source 17 supplies power to each of the other components. The processor 19 is also connected to each of the other components, to coordinate their readings, transmissions, etc. In some embodiments, the processor is configured on a circuit board, possibly with other internal electrical components.

In further detail, the embodiment in FIG. 1 depicts a fixed ultrasonic distance sensor 12, directed downward, with a 30° cone of surveillance, though the invention is not so limited. In other embodiments, a laser distance sensor can be used in place of the ultrasonic distance sensor. Such a sensor 12 may be configured, for example, to sense any object within 40 feet of the device, while the processor 19 may be set up to alert an operator of any object within 30 feet by broadcasting an alert through the transmitter or transceiver 15.

In addition, in an exemplary embodiment such as that depicted in FIGS. 1 and 4, the device 10 includes an IR temperature sensor (thermometer) 13 directed at the attached conductor 20. For example, the temperature sensor 13 may be located one inch from the conductor 20, in a fixed location and aimed directly at the conductor 20 (whose location relative to the device 10, and hence the sensor 13, remains fixed once the device 10 is attached to the conductor 20). Given the close proximity of the sensor 13 to the conductor 20 and the relatively large size of the conductor from that distance, such a sensor 13 can easily fit the conductor 20 in its designed field of view (FOV) and thus provide a highly accurate reading of the conductor temperature.

One inch is also sufficient distance to keep the temperature sensor 13 (and other important electronics, such as the processor 19) from the conductor to prevent overheating of the electronics, which may only be rated to operate up to a far lower temperature (for example, 85° C.) than that of the conductor (for example, 250° C.). Insulating these electronics (to keep them, for example, below 85° C. when the conductor temperature reaches 250° C.) may be important for effective operation of the device. To this end, air, which is a good insulator, can be used to prevent excessive heat transfer between the conductor and the electronics.

As discussed above, the IR temperature sensor 13 may further include an ambient temperature sensor 13a for measuring the ambient air temperature near the IR temperature sensor 13, and a circuit board temperature sensor 13b for measuring the temperature of the circuit board (which holds the processor 19 and possibly other electronics). The IR temperature sensor 13, ambient temperature sensor 13a, and board temperature sensor 13b are configured to relay their temperature measurements to the processor 19, which performs further processing on the measurements (for example, interpret the measurements and report them using the transmitter 15).

The processor 19, in turn, may be configured, for example, to determine if the conductor temperature exceeds certain levels (for example, predetermined levels) and issue appropriate alerts to an operator through the transmitter or transceiver 15. For instance, there can be one level (yellow)

to advise an operator that the conductor is getting too warm, and that it may be time to start taking appropriate measures (e.g., not increasing the load on the power line, or directing some of the load to other conductors) and another level (red) to advise an operator that the conductor temperature is dangerously high, and to immediate action (e.g., shutting down or significantly reducing the load on the power line, or dispatching a work crew to investigate and follow-through with appropriate measures).

In summary, the embodiments of FIGS. 1-2 and 4 depict numerous sensors 12, 13, 14 configured to sense the surroundings of the device 10 (especially in relation to the transmission line conductor 20). When one of the sensors 12, 13, 14 detects something to share with an operator, the processor 19 may be configured to, for example, alert the operator of the information by broadcasting the alert through the transceiver 15. The processor 19 may classify the information into two or more levels based on severity, such as one level (green) for normal operation, another level (yellow) for a concern (something that may need attention in the near future, but may be addressed for the moment with steps such as not increasing the load on the transmission line), and yet another level (red) for a problem (immediate attention required, such as shutting down the transmission line or dispatching a work crew to investigate and follow-through with appropriate measures).

When the operator is outside of the transmission range of the transceiver 15 of the device 10, other such devices 10 that are within the transmission range may receive the alert with their transceivers 15 and retransmit the alert. For example, a network (or mesh) of suitably spaced (for example, one-quarter mile apart) devices 10 can transmit, receive, and retransmit the alert in daisy-chain fashion along the path of a transmission line 20 to the operator or other suitable recipient of the alert (e.g., a base station, perhaps with a more powerful transmitter or a communication line to transmit the information further).

Transmission range for wireless networks can vary depending on factors such as geography and competing wireless traffic (less wireless traffic leads to better utilization of existing frequencies and to further transmission range before other transmissions compete for the same frequencies). For example, in sparsely populated areas, such as a desert, transmission range might be 20 miles, versus only a quarter mile in more densely populated areas. Factors such as the effective transmission range of the transceivers 15, the need for particular sensor data (for instance, there may be more of a need for sensor data in more crowded areas), and the amount of redundancy (in case of node failures) can be used to decide how far apart to space the devices 10.

Figure 5:
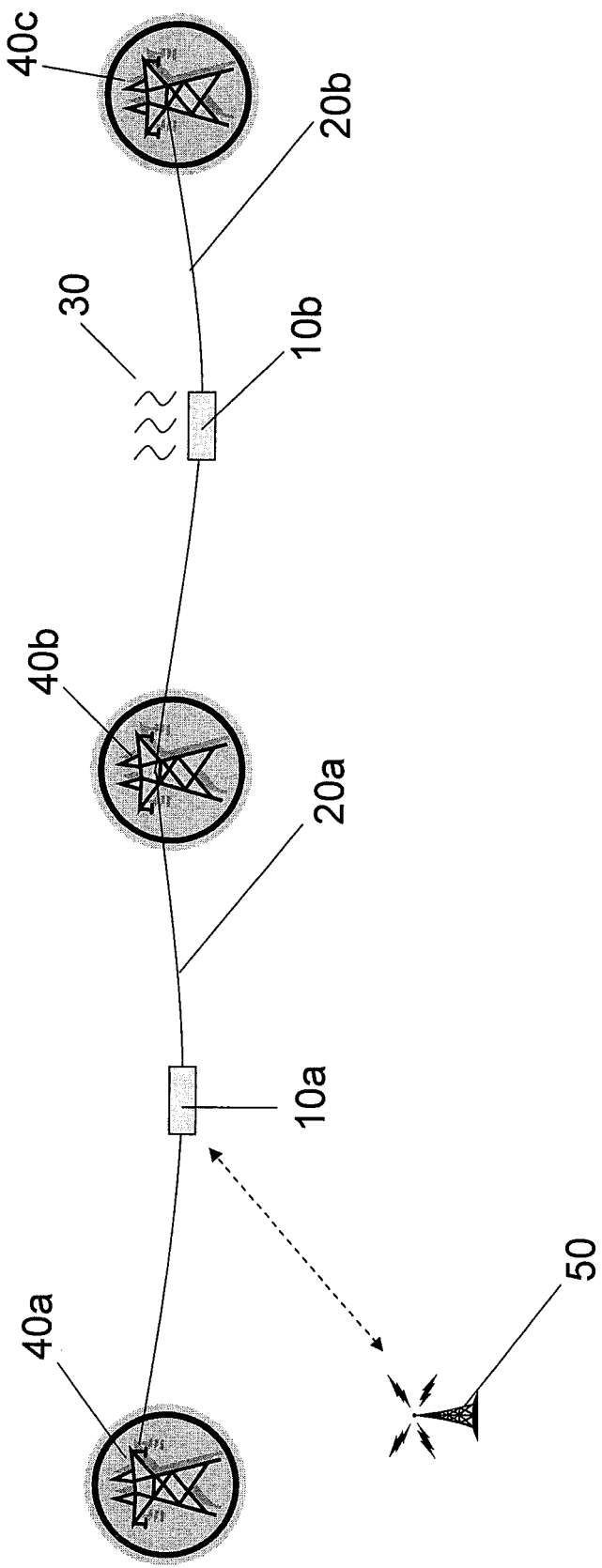
FIG. 5 is an illustration of an exemplary network of transmission line devices, according to an embodiment of the present invention.
Figure 6:
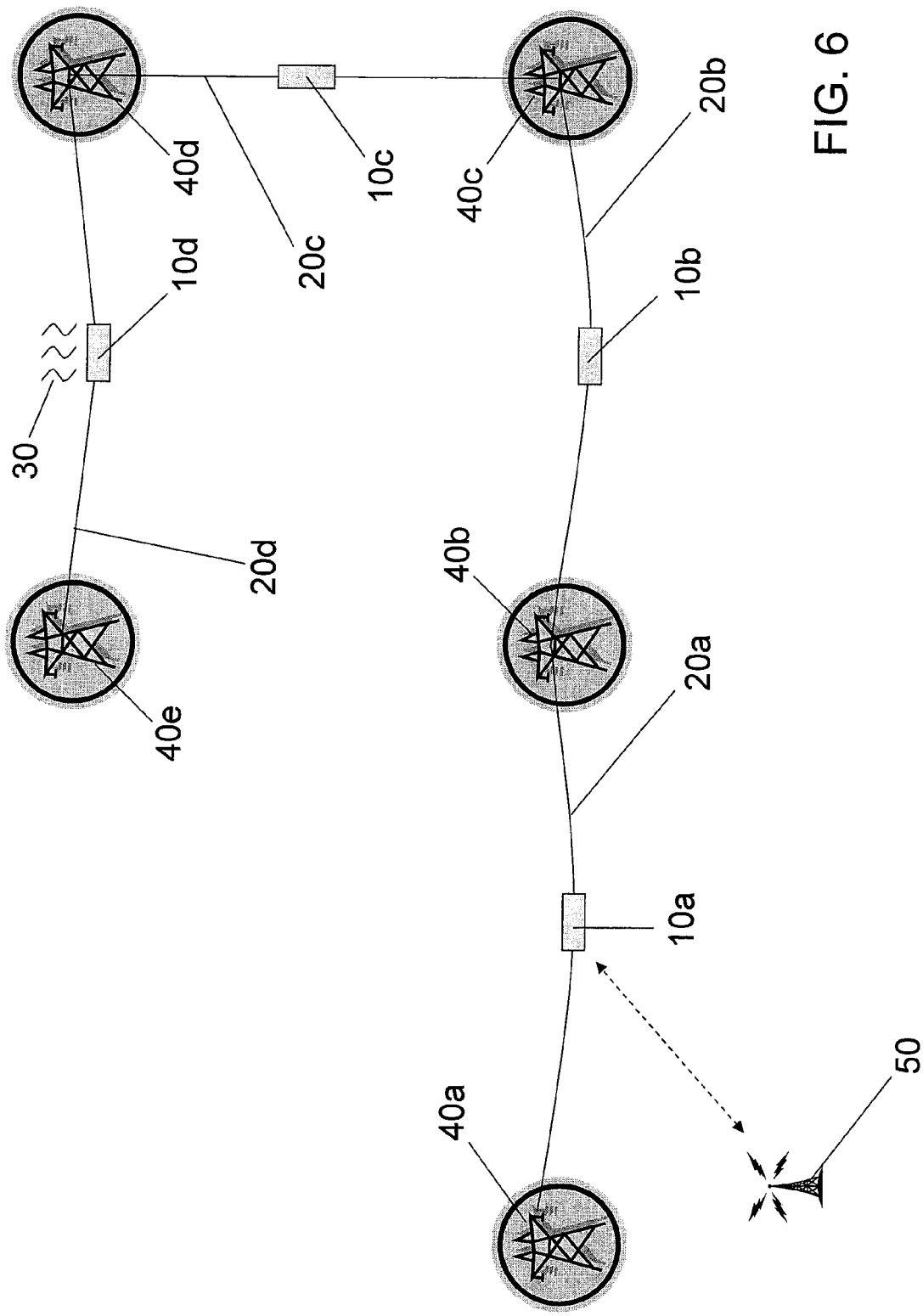
FIG. 6 is an illustration of another exemplary network of transmission line devices, according to an embodiment of the present invention.

FIGS. 5 and 6 illustrate exemplary networks of transmission line devices, according to an embodiment of the present invention.

Referring to FIG. 5, for simplicity of illustration, two devices 10, labeled separately as 10a and 10b, are shown, on transmission line spans (conductors) 20, labeled separately as 20a and 20b, respectively. Each device is located mid-span, that is, halfway between the transmission line towers 40, labeled separately as 40a, 40b, 40c (that is, between transmission line towers 40a and 40b, and between transmission line towers 40b and 40c, respectively), where the transmission line 20a or 20b is likely to be at its lowest point, and is also a good location to obtain a consistent conductor temperature measurement to compare with, for instance, those of other conductors or standard operating temperatures. For example, the transmission line towers 40a, 40b, 40c may be about one-quarter mile apart, which means devices 10a and 10b are also about one-quarter mile apart. The devices 10 may also be spaced more frequently or less frequently, depending on such as factors as completeness of coverage, transmission range of the devices 10, etc.

In the example of FIG. 5, a base station or operator station 50 may be within transmission range of device 10a but not of device 10b (if, for instance, the transmission ranges of the devices 10 is between one-quarter and one-half mile). An unusually high temperature 30 (in this case, on transmission line 20b) on the power line 20 can be sensed with device 10b, which can alert the operator station 50 by transmitting the alert to device 10a, which then receives the alert and retransmits it to the base or operator station 50.

FIG. 6 is similar to FIG. 5, only the transmission line 20 has two more spans 20c and 20d that are shown extended to two more transmission line towers 40d and 40e, with third and fourth devices 10c and 10d added as well, and conductor 20d experiencing the unusually high operating temperature 30 (as sensed by device 10d). It should be noted that devices 10c and 10d are further from operator station 50 than either device 10a or device 10b.

Referring to FIG. 6, the operator station 50 may be within the transmission range of both devices 10a and 10b, but not of devices 10c or 10d. Both devices 10a and 10b, however, may be in transmission range of devices 10c and 10d. Thus, device 10c or 10d could relay a message to operator station 50 by transmitting a message to one or both of devices 10a and 10b, with one or both of devices 10a and 10b receiving and retransmitting the message to operator station 50. It should be noted that in this case, device 10c can relay a message to operator station 50, even if one of devices 10a or 10b was "offline" (that is, not capable of retransmitting messages from other devices). Thus, the network has a certain amount of redundancy or fault tolerance built into it.

Other locations for the devices 10 are also possible. For example, they may be positioned near a transmission line tower 40, instead of or in addition to being positioned mid-span. In addition, the transmission range of the devices 10 may be considerably farther, which allows room for more redundancy in cases such as transmitter 15 failure in the device 10, or for variance in transmission ranges (of the transmitters 15) among the devices 10 or variance in the distance between devices 10, without compromising the network.

Care should be taken to control and coordinate the message relaying. For example, each message (alert) from a monitor can be identified and time-stamped from that monitor. That way, when another monitor in the network receives the message, that receiving monitor can detect if it has received (and retransmitted) that message already and, if not, retransmit the message for other monitors in the network to receive. This promotes distribution of the message throughout the network and without unnecessary retransmissions of the message. Still other protocols (for example, notifying the sender or other interested devices of the receipt of a message by an intended recipient) can be built into the communications to make them more robust and ensure that the messages reach their intended recipients and without using excessive communication resources.

Figure 7:
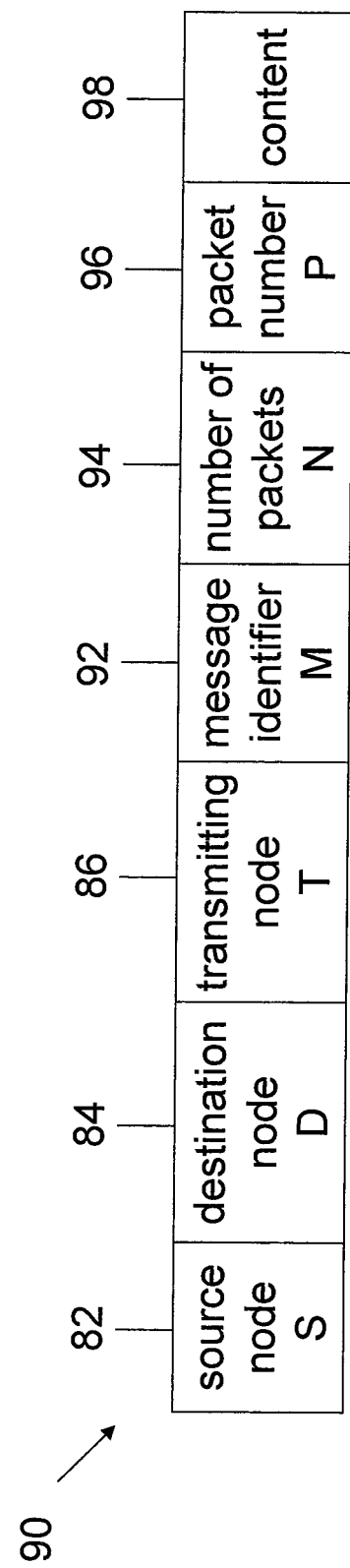
FIG. 7 is an exemplary data packet for communicating between multiple devices according to an embodiment of the present invention.
Figure 8:
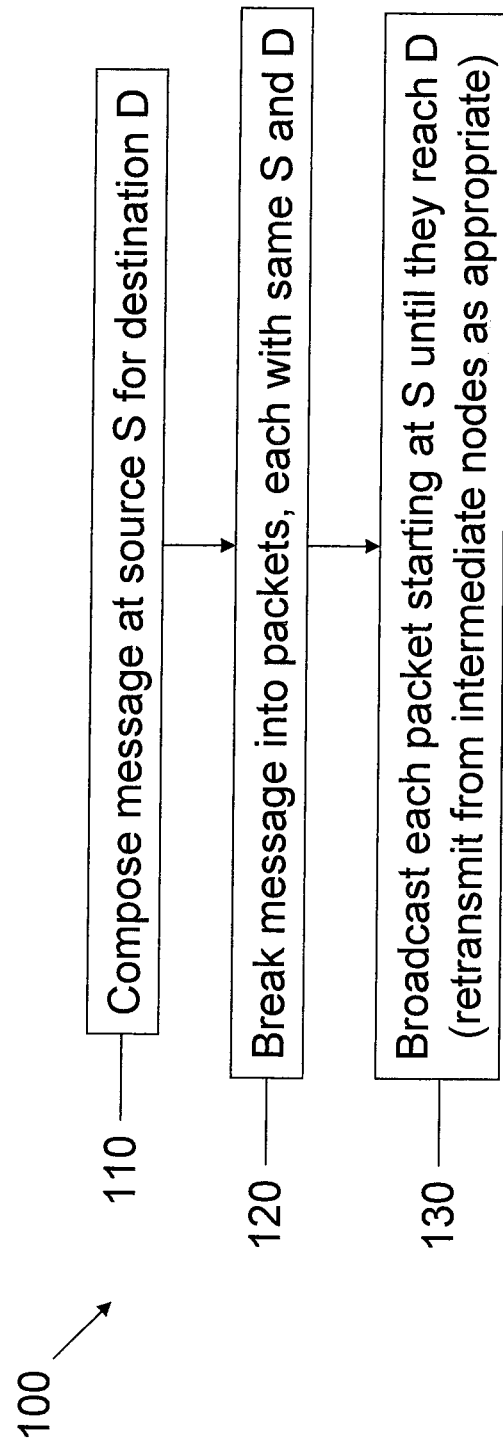
FIG. 8 is an exemplary method for communicating between multiple devices in a mesh network according to an embodiment of the present invention.
Figure 9:
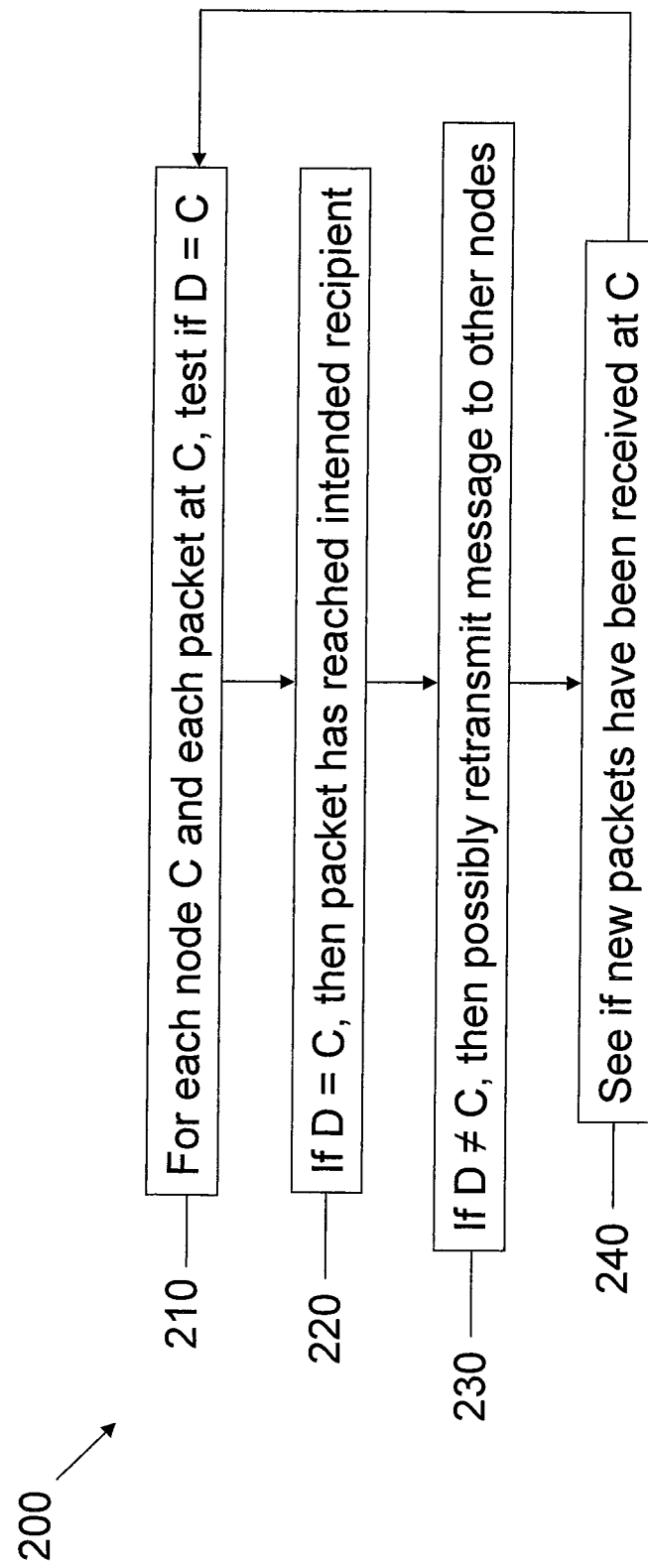
FIG. 9 is an exemplary method for retransmitting between multiple devices in a mesh network according to an embodiment of the present invention.

FIG. 7 is an exemplary data packet 90 for communicating between multiple devices according to an embodiment of the present invention. FIG. 8 is an exemplary method 100 for communicating between multiple devices (nodes) set up in a mesh network according to an embodiment of the present invention. FIG. 9 is an exemplary method 200 for retransmitting between multiple devices in the mesh network according to an embodiment of the present invention. FIG.

10 is an exemplary method 300 for initializing multiple devices in the mesh network according to an embodiment of the present invention.

Referring to FIGS. 7 and 8, data (for example, sensed information from a particular device) is communicated wirelessly between nodes (devices) on agreed-upon radio frequencies or frequency ranges (for example, 900 MHz or 2.4 GHz) using standard wireless communication technology (e.g., wireless transmitters and receivers using the IEEE 802.11 standard, readily available commercial products conforming to government broadcast regulations). For example, the 900 MHz (33-centimeter) band (with 50 frequencies allocated between 902 MHz and 928 MHz, such as 915 MHz), could be used. There are several competing technologies making use of this band, including frequency-hopping spread spectrum (FHSS), which rapidly switches between numerous frequencies to help reduce interference while improving wireless transmission security.

The data is sent as a message between a source node and a destination node within a mesh network. The data may be formed into packets 90, such as the exemplary packet 90 in FIG. 7.

As shown in FIG. 7, each packet 90 has several fields, such as a source address S (also labeled 82 in FIG. 7), a destination address D (84), a transmitting node T (86), a message identifier M (92), a packet count N (94), a packet number P (96), and content 98. Each such address S, D, and T can be, for example, a Media Access Control (MAC) address (i.e., a unique identifier), as defined in the IEEE 802 family of standards. Since the same packet 90 can be received from different nodes (through retransmissions), T can be used to identify which node transmitted a particular copy of the packet 90. In other embodiments, T can be a simple number, representing in the particular mesh network the (linear) order of the corresponding node (assuming the nodes are numbered sequentially relative to, say, their location along the transmission line). This can help in determining whether a node should retransmit the packet 90, which will be described more fully later.

The message identifier M can also help with message retransmissions. M can be a count that increments with each message sent from a particular source. In this fashion, nodes can identify when they receive the same packet again (and thus not have to retransmit) by examining the S, M, and P fields. It should be noted that these fields are only exemplary and may differ in other embodiments.

In an exemplary embodiment, when communicating with a base station, one of S or D is the MAC address of the base station (henceforth labeled B). For example, B can be programmed (in non-volatile memory) into each of the nodes during installation, along with the location (latitude and longitude) of the node. The other one of S or D is the MAC address of the device that either originates the message or is the intended recipient of the message (for example, when sending a message from the base station B to the device). By programming B into each of the nodes, the nodes can also tell when they receive messages from transmitting devices that are not part of the network (different mesh networks can have different base stations and thus, different values of B). Messages are communicated between nodes within the mesh network using the method 100, which will now be described in more detail with reference to FIG. 8.

In step 110, the message is composed at the source node S, with an intended recipient node D. Here, the nodes can be devices or the base station B. The message content can be, for example, status at a particular device that is being sent to the base station B (that is, S=the MAC address of the particular device and D=B), or information intended for a particular device (that is, S=B and D=the MAC address of the particular device).

In step 120, the message is broken into packets or frames, if necessary. Depending on the wireless and networking protocols, messages may be broken up and transmitted in smaller portions such as packets and/or frames. For ease of description, messages in this disclosure can be thought of as being composed simply of packets. Each packet is transmitted individually and received as a unit, with S and D fields, message (content) portion, and any other information associated with the packet (such as the packet number P in a multi-packet message or other fields of example packet 90 in FIG. 7).

In step 130, each of the packets is broadcast from S. They may reach D in the first transmission from S, but if not, they are received at other nodes and then retransmitted until they reach D. Messages are retransmitted between nodes within the mesh network using the method 200, which will now be described in more detail with reference to FIG. 9.

In step 210, each node C examines each of the packets that it has received from other nodes, to see if they have arrived at the intended recipient (i.e., does D=C?) or if they need to be retransmitted. In step 220, for each packet, if D=C, then the packet has reached its intended recipient, and no further transmission or retransmission needs to be done. Node C would wait until all of the packets associated with the message arrived, and then recombine the packets and process the message accordingly. For example, the message could be a request from the base station B for information from the device. The device would process the request and broadcast a response back to the base station B. In some embodiments, node C may want to inform the sender S that it received the packet or the message.

In step 230, for any packet that has not reached its intended recipient (that is, D≠C), node C may retransmit the packet to the other nodes in transmission range (updating the transmitting node field T to now reflect that node C is the transmitting node). This retransmission has an associated protocol (to be discussed in more detail later) to prevent unnecessary packet retransmissions from consuming too much resources of the wireless network or the node. For example, the nodes can be sorted in a canonical order (i.e., linear or one-dimensional topology) by wireless proximity to each other (such as by their order on a transmission line) or can have their locations (e.g., latitude and longitude) stored at the base station in the form of a table, as described further below. Nodes can also keep track of which packets they have already forwarded and not retransmit any packets they have already forwarded.

Thus, nodes might only retransmit those packets that are making "forward progress" to their destinations. This could be based on, for example, whether the transmitting node T is "farther" from the destination node D than the current node C is (which could be based on, for example, node order or node distance). If so, node C retransmits the packet. In other embodiments, retransmissions could be limited to only those nodes that are one hop away (that is, one node apart in the canonical ordering) from the transmitting nodes and in the direction of the destination node. A range could also be used (e.g., one or two hops away). Instead or in addition, retransmissions could be only done once at each node for a particular packet. By keeping a list of the most recently retransmitted packets, each device can compare newly received packets against the list to see if they have already forwarded them. Since the duration of a packet is relatively short, the list can be overwritten with newer packets (as in a circular list) to keep the size of the list manageable in the computing resources of each node. These techniques significantly reduce unnecessary retransmissions. When one of the nodes goes offline, the network can be restored by reinitializing as discussed below.

In step 240, node C checks to see if any new packets have arrived, and whether they are part of communications within this network (by checking that one of S or D is B). If so, they are added to the group of packets waiting to be processed in step 140, and steps 210-240 are repeated. Steps 210-240 can be repeated indefinitely. In addition, in some embodiments, when a node receives a packet whose destination is the base station, the node can measure the signal strength of the transmitted packet and relay this information with the packet to the base station. This allows the base station to monitor how strong the signals are between neighboring nodes.

Figure 10:
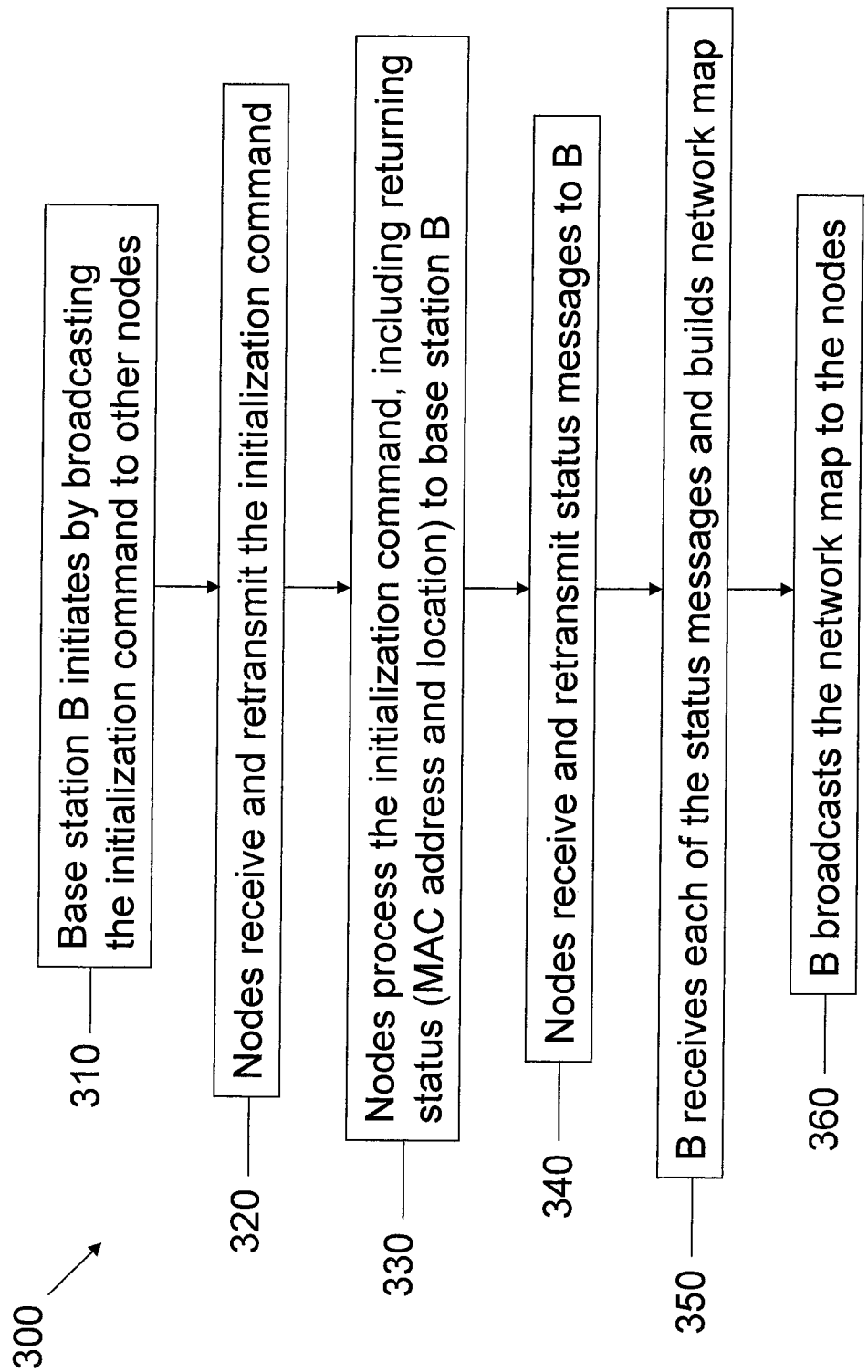
FIG. 10 is an exemplary method for initializing multiple devices in a mesh network according to an embodiment of the present invention.

As discussed above, in an exemplary embodiment, nodes can be initialized (for example, ordered) so that the base station and the nodes are aware of the network map, for instance, so retransmissions of packets within the mesh network (e.g., step 230 of FIG. 9) can be easily managed without risk of overloading the network with excessive retransmissions. Initialization (that is, building the network) can take place at various points, such as when starting the network for the first time, restarting the network after a power failure, adding or deleting nodes, moving the base station, handling when a node goes offline (for example, due to hardware or software malfunction, or loss of power), etc. For instance, an exemplary implementation takes 5-10 minutes to initialize a network of 100 such devices. The exemplary initialization method 300 will now be described in more detail with reference to FIG. 10.

For simplification, assume in step 310 that the base station B initiates the initialization by broadcasting an initialization command to the network. Assume also that the base station B has associated with it a general purpose computer and a storage device for managing the mesh network. For further simplification, assume each mesh network has a single base station and that the devices in the network only belong to one network. Thus, the network is unique by the unique address B of the base station. It is assumed that each node is aware of B, for example, by having B programmed into its non-volatile memory during installation along with the node's location (latitude and longitude).

In step 320, the nodes start receiving the initialization command and retransmitting it to other nodes. Each node need only retransmit it once no matter how many times they receive it. This will terminate the retransmissions once every node in range has received the command and retransmitted it once. The nodes will recognize that the initialization command is associated with this mesh network as they can compare the MAC address of the originating node with that of the base station B associated with this mesh network and only process the command (including retransmitting it) if the two addresses are the same.

In step 330, each node processes the initialization command. This may include clearing out existing messages and other internal initialization. It may also include preparing and sending a response to the base station B. The response may include information like the MAC address of the node as well as the node's location (e.g., latitude and longitude), that are stored in the node's non-volatile memory when the node is installed on the transmission line.

In step 340, each node receives and retransmits the status messages from the other nodes. As in step 320, each node need only retransmit the status message from each other node once no matter how many times they receive it.

In step 350, the base station B receives the status messages from each of the nodes in the network. Using the locations and MAC address of the nodes (that can be stored and sorted in a table on the base station's computer), the base station B can build a map or ordering of the network (for example, a linear or one-dimensional topology, such as a canonical ordering based on location along the transmission line).

Finally, in step 360, the base station can distribute this mapping to each of the nodes (for example, by a general broadcast or an individual message to each node) so that each node is aware of its location in the network and its nearest neighbors. This broadcast or message sending can follow similar protocols to those of earlier steps. At this point, every node is aware of the topology and their relative location in it. Accordingly, nodes can proceed with only forwarding messages in the correct direction (that is, only retransmitting when they are between the destination node and the node that last transmitted the packet to them). This is in addition to other steps, such as only retransmitting a packet once regardless of how many times they receive it.

A mesh network as described in the above embodiments has several features. For instance, if one of the nodes becomes inoperative (for example, fails to respond to messages or report status), the node can be dynamically removed from the network map by doing an initialization as in method 300. Because of overlapping transmission ranges of the different nodes, the newly removed node is bypassed and the network map updated in a relatively brief operation. Appropriate action (for example, dispatching a work crew) can then be taken to repair or replace the failing node.

In addition, as described above, transmission signal strength can be measured by receiving nodes and this information forwarded to the base station B. This can identify weak points in the network map (for example, when neighboring nodes are experiencing weak signal transmissions between themselves).

Further, since each device is associated with only one base station, competing networks would not interfere with each other. That is, nodes of one network would recognize that transmissions of another network did not share the base station address and not process or retransmit any of the other network's packets.

Figure 11:
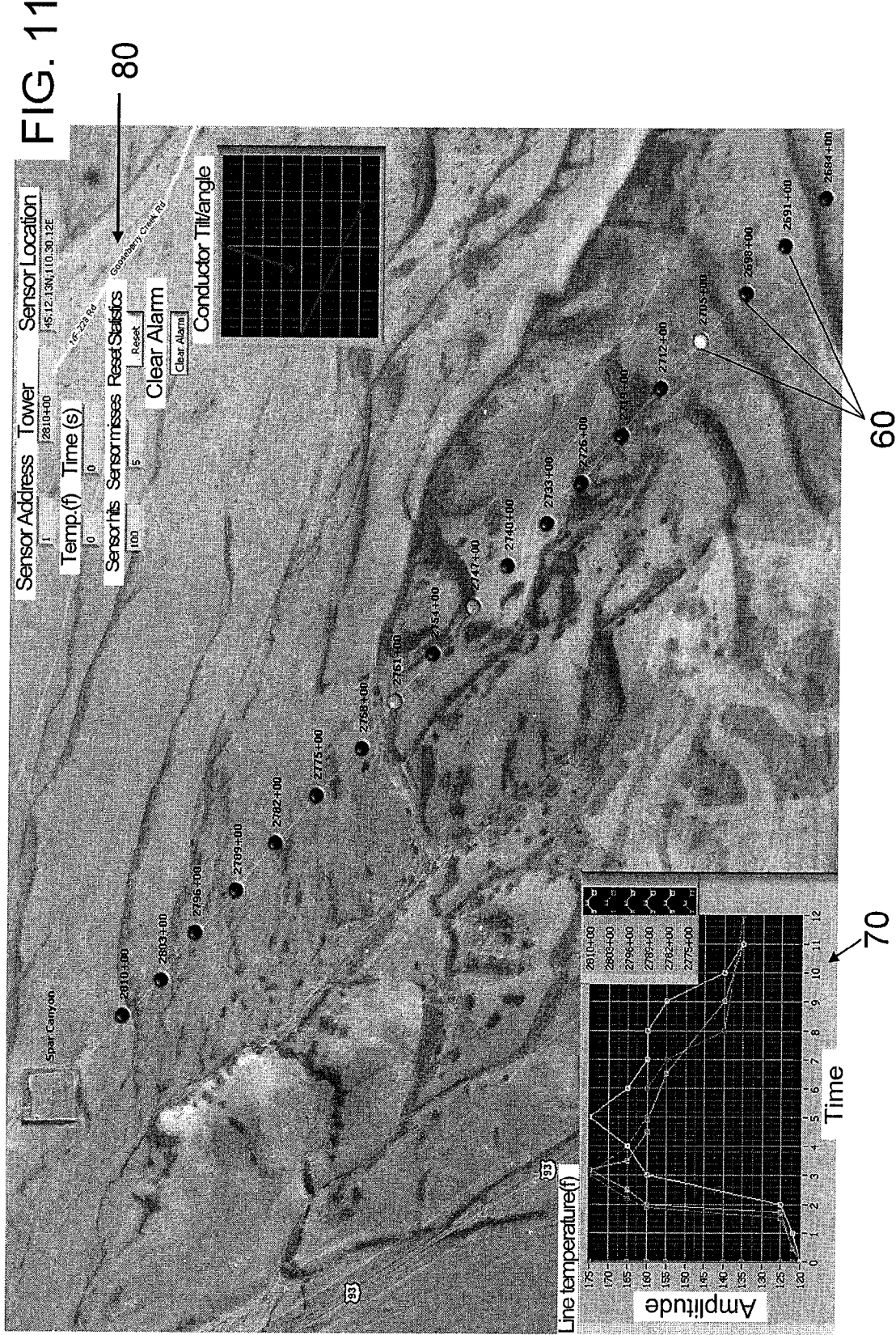
FIG. 11 is a screen shot of a graphical depiction of the status of the transmission line devices is an exemplary network of such devices, according to an embodiment of the present invention.

FIG. 11 is a screen shot of a graphical depiction of the status of the transmission line devices 10 in an exemplary network of such devices, according to an embodiment of the present invention.

Referring to FIG. 11, the devices 10 are shown on a topographic map as status circles 60 corresponding to their locations and status. The statuses can be represented, for example, as different sizes, shapes, shades, or colors (e.g., green="OK," yellow="may need to investigate," red="a problem"). There can be different displays for different sensors (such as distance to objects below, temperature of the conductor, etc.) For instance, a display for distance below the transmission line to the closest object may use three different color circles: green for greater than 40 feet (i.e., out of sensor range), yellow for between 30 and 40 feet (i.e., in sensor range, but not an immediate concern), and red for less than 30 feet (i.e., in sensor range and a concern). Similar codes can be used to describe the temperature of the conductor, for example, green for under 70° C. (i.e., normal operation), yellow for between 70° C. and 100° C. (i.e., still within acceptable operating range, but a concern), and red for above 100° C. (i.e., exceeding normal operating range; immediate action necessary).

Also shown in FIG. 11 is a graphical depiction 70 over time of the status of one or more devices, in this case the conductor temperature of six devices. One axis (for instance, the horizontal axis) can represent time (as shown in graphical display 70), another axis (e.g., the vertical axis) can represent a sensor measurement (for example, temperature of the conductor, as shown in graphical display 70), with lines connecting the measurements of one device 10 over time and different lines representing different devices 10.

In addition, FIG. 11 also shows an individual device section 80, for showing detailed information for a particular device 10 (for example, location, conductor temperature, transmission line clearance). Selecting (for example, "clicking" on the display with a pointing device) one of the device locations causes the fields in device section 80 to be updated for that particular device 10.

The same technology described above can also be used to measure the temperature of any object whose line of sight remains fixed relative to the device 10. For instance, in some embodiments, the temperature of a neighboring transmission line can be monitored. In other embodiments, the ambient temperature of the IR temperature sensor and the board temperature of the electronics (e.g., processor) circuit board are monitored and reported.

In one embodiment, the device is configured for an extra high voltage transmission line, that is, a transmission line designed to carry more than 345 kilovolts (kV) between conductors, preferably between 345 kV and 765 kV. In other embodiments, the device is configured for a high voltage transmission line, that is, a transmission line designed to carry more than 110 kV. In still other embodiments, the device is configured for any power line.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. Nonetheless, all such and similar modifications of the teachings of this invention will still fall within the scope of this invention. Furthermore, some of the features of the embodiments of this invention could be used to advantage without the corresponding use of other features. As such, the foregoing description should be considered as merely illustrative of the principles of the invention, and not in limitation thereof.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A device configured to attach to an electrical power line at a fixed location along a length of the electrical power line, the device comprising:
    a distance sensor configured to measure a distance of a nearest object to the device at the fixed location;
    a wireless transmitter;
    a processor adapted to:
        interpret the measured distance from the distance sensor to the nearest object; and
        transmit a message related to the interpreted distance through the transmitter; and
    a power supply configured to supply power to the distance sensor, the transmitter, and the processor.

2. The device of claim 1, wherein the distance sensor comprises an ultrasonic or laser distance sensor.

3. The device of claim 1, wherein the power line comprises a transmission line.

4. The device of claim 3, wherein the transmission line comprises a high voltage line.

5. The device of claim 4, wherein the high voltage line is configured to operate between 110 kV and 765 kV.

6. The device of claim 1, wherein the power supply comprises an inductive power supply configured to generate power inductively from the power line.

7. The device of claim 1, wherein the distance sensor is configured to sense down and measure the distance to the object that is beneath the power line.

8. The device of claim 1, wherein the distance sensor is configured to sense sideways and measure the distance to the object that is beside the power line.

9. The device of claim 1, further comprising a global navigation satellite system sensor to identify a location of the device, wherein the processor is further adapted to transmit the location in the message.

10. The device of claim 1, further comprising a wireless receiver configured to receive another such message from another such device, wherein the processor is further adapted to:
    receive the other message from the other device through the receiver; and
    retransmit the other message through the transmitter.

11. A method of automated measuring and alerting of a nearest object in a proximity of an electrical power line using a distance sensor configured in a device attached to the power line at a fixed location along a length of the power line and comprising a wireless transmitter and a processor, the method comprising:
    measuring a distance of the nearest object to the device at the fixed location using the distance sensor;
    interpreting the measured distance to the nearest object using the processor; and
    transmitting a message based on the interpreted distance using the transmitter.

12. The method of claim 11, wherein the power line comprises a transmission line.

13. The method of claim 11, wherein the distance sensor comprises an ultrasonic or laser distance sensor.

14. The method of claim 11, wherein the device further comprises a wireless receiver configured to receive another such message from another such device, and wherein the method further comprises:
    receiving the other message from the other device through the receiver; and
    retransmitting the other message through the transmitter.

15. The method of claim 11, wherein the device is further configured to generate power inductively from the power line.

16. A network of devices, each configured to attach to an electrical power line at a respective fixed location along a length of the electrical power line and communicate with an intended recipient, each device of the network of devices comprising:
    a distance sensor configured to measure a distance of a nearest object to the device at the respective fixed location;
    a wireless transceiver;

an inductive power generator configured to generate electrical power inductively from the power line for use by the device; and
a processor adapted to:
interpret the measured distance from the distance sensor to the nearest object;
transmit a message related to the interpreted distance through the transceiver;
receive another such message through the transceiver from another device in the network of devices; and
retransmit the other message from the other device through the transceiver,
wherein the network of devices is configured to wirelessly communicate the message from the device to the intended recipient.

17. The network of claim 16, wherein the power line comprises a transmission line.

18. The network of claim 16, wherein the network is further configured to wirelessly communicate the message from the device to the intended recipient even in the event that another of the devices in the network is unable to retransmit messages.

19. The network of claim 16, wherein the distance sensor is configured to sense down and measure the distance to the object that is beneath the power line.

20. The network of claim 16, wherein each device of the network of devices further comprises a global navigation satellite system sensor to identify a location of the device, and wherein the processor is further adapted to transmit the location in the message.

21. A device configured to attach to an electrical power line, the device comprising:
a temperature sensor configured to measure a temperature of a conductor of the power line when the device is attached to the power line;
a wireless transmitter;
a processor configured to:
interpret the measured temperature from the temperature sensor; and
transmit a message related to the interpreted temperature through the transmitter; and
a power supply configured to supply power to the temperature sensor, the transmitter, and the processor.

22. The device of claim 21, wherein the temperature sensor comprises an infrared temperature sensor.

23. The device of claim 21, wherein the power line comprises a high voltage transmission line.

24. The device of claim 21, wherein the power supply comprises an inductive power supply configured to generate power inductively from the power line.

25. The device of claim 21, wherein
the temperature sensor comprises an ambient temperature sensor for measuring an ambient temperature in a proximity of the temperature sensor, and
the processor is further configured to:
interpret the measured ambient temperature from the ambient temperature sensor; and
transmit a message related to the interpreted ambient temperature through the transmitter.

26. The device of claim 21, wherein
the temperature sensor comprises a board temperature sensor for measuring a board temperature of a circuit board comprising the processor, and
the processor is further configured to:
interpret the measured board temperature from the board temperature sensor; and
transmit a message related to the interpreted board temperature through the transmitter.

27. The device of claim 21, further comprising a global navigation satellite system sensor to identify a location of the device, wherein the processor is further configured to transmit the location in the message.

28. The device of claim 21, further comprising a wireless receiver configured to receive another such message from another such device, wherein the processor is further configured to:
receive the other message from the other device through the receiver; and
retransmit the other message through the transmitter.

29. A method of automated measuring and alerting of a temperature of a conductor of an electrical power line using a temperature sensor configured in a device attached to the power line and comprising a wireless transmitter and a processor, the method comprising:
measuring the temperature of the object using the temperature sensor;
interpreting the measured temperature using the processor; and
transmitting a message based on the interpreted temperature using the transmitter.

30. The method of claim 29, wherein the power line comprises a transmission line.

31. The method of claim 29, wherein the temperature sensor comprises an infrared temperature sensor.

32. The method of claim 29, wherein the device further comprises a wireless receiver configured to receive another such message from another such device, and wherein the method further comprises:
receiving the other message from the other device through the receiver; and
retransmitting the other message through the transmitter.

33. The method of claim 29, wherein the device is further configured to generate power inductively from the power line.

34. A network of devices, each configured to attach to an electrical power line and communicate with an intended recipient, each device of the network of devices comprising:
a temperature sensor configured to measure a temperature of a conductor of the power line when the device is attached to the power line;
a wireless transceiver;
an inductive power generator configured to generate electrical power inductively from the power line for use by the device; and
a processor configured to:
interpret the measured temperature from the temperature sensor;
transmit a message related to the interpreted temperature through the transceiver;
receive another such message through the transceiver from another device in the network of devices; and
retransmit the other message from the other device through the transceiver,
wherein the network of devices is configured to wirelessly communicate the message from the device to the intended recipient.

35. The network of claim 34, wherein the power line comprises a transmission line.

36. The network of claim 34, wherein the network is further configured to wirelessly communicate the message from the device to the intended recipient even when another of the devices in the network is unable to retransmit messages.

37. The network of claim 34, wherein the temperature sensor comprises an infrared temperature sensor.

38. The network of claim 37, wherein
the temperature sensor further comprises one of an ambient temperature sensor for measuring an ambient temperature in a proximity of the temperature sensor or a board temperature sensor for measuring a board temperature of a circuit board comprising the processor, and
the processor is further configured to:
interpret one of the measured ambient temperature from the ambient temperature sensor or the measured board temperature from the board temperature sensor; and
transmit a message related to one of the interpreted ambient temperature or the interpreted board temperature through the transceiver.

39. A device configured to attach to an electrical power line, the device comprising:
a sensor for sensing a vicinity of the power line;
a wireless transceiver for interconnecting the device with other devices in a wireless network by receiving messages from the other devices and retransmitting those ones of the messages not intended for the device;
a processor for:
interpreting a sensor reading from the sensor, and
transmitting a message related to the interpreted sensor reading through the transceiver; and
a power supply for supplying power to the sensor, the transceiver, and the processor,
wherein the sensor comprises at least one of a temperature sensor configured to measure a temperature of a conductor of the power line when the device is attached to the power line or a distance sensor configured to measure a distance of a nearest object to the device.

40. The device of claim 39, wherein the power line comprises a high voltage transmission line.

41. The device of claim 39, wherein the power supply comprises an inductive power supply for generating power inductively from the power line.

42. The device of claim 41, where the device further comprises a capacitor for supplying stored power to the device.

43. The device of claim 39, wherein the transceiver is configured to retransmit each of the messages no more than once.

44. The device of claim 39, wherein the transceiver is configured to only retransmit those ones of the messages whose intended recipients are closer to the device than they are to corresponding ones of the devices that transmitted the ones of the messages.

45. The device of claim 44, wherein "closer" is defined by a linear order of the devices.

46. The device of claim 39, further comprising a non-volatile memory for storing an address of a base station.

47. The device of claim 46, wherein the non-volatile memory is further for storing a location of the device.

48. A method of automated sensing of a proximity of an electrical power line using a sensor configured in each of a wireless network of devices attached to and inductively powered by the power line and each comprising a transceiver and a processor for communicating with a transceiver-equipped base station, the method comprising:
sensing a vicinity of the power line using the sensor in one of the devices;
interpreting a sensor reading from the sensor using the processor of the one of the devices;
transmitting a first message based on the interpreted sensor reading using the transceiver of the one of the devices; and
receiving and retransmitting the first message using the transceiver of others of the devices to forward the message to the base station,
wherein the sensor comprises at least one of a temperature sensor configured to measure a temperature of a conductor of the power line or a distance sensor configured to measure a distance of a nearest object to the one of the devices.

49. The method of claim 48, further comprising:
transmitting a second message to the one of the devices using the transceiver of the base station; and
receiving and retransmitting the second message using the transceiver of the others of the devices to forward the message to the one of the devices.

50. The method of claim 49, wherein the one of the devices transmits the first message in response to receiving the second message.

51. The method of claim 48, wherein the receiving and retransmitting of the first message comprises only retransmitting the first message in the transceiver of ones of the devices that are closer to the base station than corresponding ones of the devices from which they received the first message are to the base station.

52. The method of claim 51, wherein "closer" is defined by a linear order of the network of devices.

53. The method of claim 52, further comprising initializing the network of devices to define the linear order by:
transmitting a command using the transceiver of the base station; and
receiving and retransmitting the command using the transceiver of the devices.

54. The method of claim 53, further comprising re-initializing the network of devices to redefine the linear order when a device is added to or removed from the network.

55. The method of claim 48, wherein each of the others of the devices retransmits the first message no more than once.

56. A wireless network of devices, each configured to attach to an electrical power line and communicate with a transceiver-equipped base station, each device of the network of devices comprising:
a sensor for sensing a vicinity of the power line;
a wireless transceiver for interconnecting the device with others of the devices and with the base station by receiving messages from the others of the devices and retransmitting those ones of the messages not intended for the device;
an inductive power generator for generating electrical power inductively from the power line for use by the device; and
a processor for:
interpreting the sensor reading from the sensor;
transmitting a message related to the interpreted sensor reading through the transceiver;
receiving another such message through the transceiver from another of the devices; and
retransmitting the other message from the other device through the transceiver only if the device is closer to the base station than the other device is to the base station,
wherein the sensor comprises at least one of a temperature sensor configured to measure a temperature of a conductor of the power line when the device is attached to the power line or a distance sensor configured to measure a distance of a nearest object to the device.

57. The network of devices of claim 56, wherein "closer" is defined by a linear order of the network of devices that is dynamically defined by an initialization routine initiated by the base station.

58. The device of claim 1, wherein the fixed location along the length of the electrical power line is mid-span between locations where the electrical power line is supported.

59. The device of claim 1, wherein the distance sensor is configured to measure a distance up to 40 feet.

60. The method of claim 11, wherein the fixed location along the length of the power line is mid-span between locations where the power line is supported.

61. The method of claim 11, wherein the distance sensor is configured to measure a distance up to 40 feet.

62. The network of claim 16, wherein the respective fixed location along the length of the electrical power line is mid-span between locations where the electrical power line is supported.

63. The network of claim 16, wherein the distance sensor is configured to measure a distance up to 40 feet.

* * * * *